US008566432B2

(12) United States Patent
DeMoney

(10) Patent No.: US 8,566,432 B2
(45) Date of Patent: Oct. 22, 2013

(54) SCHEDULING STORAGE ACCESSES FOR RATE-GUARANTEED AND NON-RATE-GUARANTEED REQUESTS

(75) Inventor: Michael A. DeMoney, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 2584 days.

(21) Appl. No.: 10/787,689

(22) Filed: Feb. 26, 2004

(65) Prior Publication Data

US 2004/0205166 A1 Oct. 14, 2004

Related U.S. Application Data

(63) Continuation of application No. 09/413,043, filed on Oct. 6, 1999, now Pat. No. 6,721,789.

(51) Int. Cl.
*H04L 15/16* (2006.01)

(52) U.S. Cl.
USPC ........... 709/223; 709/224; 709/225; 709/233; 709/245; 725/145; 725/146; 725/147; 725/148

(58) Field of Classification Search
USPC ............. 709/219/220/221; 370/486, 514, 234
See application file for complete search history.

(56) References Cited

U.S. PATENT DOCUMENTS

| 4,843,543 A | * | 6/1989 | Isobe | ............................ 711/148 |
| 5,303,347 A | | 4/1994 | Gagne et al. | |
| 5,463,620 A | | 10/1995 | Sriram | |
| 5,526,356 A | | 6/1996 | Kim et al. | |
| 5,581,784 A | * | 12/1996 | Tobagi et al. | ..................... 710/6 |

(Continued)

FOREIGN PATENT DOCUMENTS

| EP | 625 858 | 11/1994 |
| EP | 0716370 A2 | 11/1995 |

(Continued)

OTHER PUBLICATIONS

"Bit-Rate Control Using Piecewise Approximated Rate-Distortion Characteristics" IEEE Aug. 1998 http://www.angelfire.com/electronic2/ricardo_neri/00709411.pdf.*

(Continued)

*Primary Examiner* — Krista Zele
*Assistant Examiner* — Randy Scott
(74) *Attorney, Agent, or Firm* — Robert C. Kowert; Meyertons, Hood, Kivlin, Kowert & Goetzel, P.C.

(57) ABSTRACT

A system for managing storage accesses for rate guaranteed continuous data streams and non-rate-guaranteed storage requests may include a plurality of rate guaranteed requestors for data streams and one or more non-rate guaranteed requestors. A disk scheduler for the system may have a guaranteed rate queue for queuing storage requests from the rate guaranteed requestors and a non-rate-guaranteed queue for queuing requests from the non-rate-guaranteed requesters. The disk scheduler may include a bandwidth allocator coupled to the guaranteed rate queue and the non-rate-guaranteed queue. The bandwidth allocator may be configured to allocate bandwidth of a storage system between the guaranteed rate queue and the non-rate-guaranteed queue according to a predetermined ratio. The rate guaranteed requestors may be limited so that an aggregate of maximum stream rates guaranteed for each rate guaranteed requestor does not exceed the portion of the bandwidth allocated to the guaranteed rate queue.

27 Claims, 11 Drawing Sheets

(56) References Cited

U.S. PATENT DOCUMENTS

| | | | |
|---|---|---|---|
| 5,644,786 A | 7/1997 | Gallagher et al. | |
| 5,708,632 A | 1/1998 | Totsuka et al. | |
| 5,708,796 A * | 1/1998 | Ozden et al. | 711/167 |
| 5,721,956 A | 2/1998 | Martin et al. | |
| 5,758,076 A * | 5/1998 | Wu et al. | 709/231 |
| 5,761,692 A | 6/1998 | Ozden et al. | |
| 5,787,482 A | 7/1998 | Chen et al. | |
| 5,802,394 A | 9/1998 | Baird et al. | |
| 5,805,804 A | 9/1998 | Laursen et al. | |
| 5,805,821 A | 9/1998 | Saxena et al. | |
| 5,815,662 A | 9/1998 | Ong | |
| 5,832,304 A | 11/1998 | Bauman et al. | |
| 5,881,245 A | 3/1999 | Thompson | |
| 5,892,915 A * | 4/1999 | Duso et al. | 709/219 |
| 5,917,822 A | 6/1999 | Lyles et al. | |
| 5,926,649 A | 7/1999 | Ma et al. | |
| 5,928,327 A | 7/1999 | Wang et al. | |
| 5,933,603 A | 8/1999 | Vahalia et al. | |
| 5,944,792 A | 8/1999 | Yamato et al. | |
| 6,021,464 A | 2/2000 | Yao et al. | |
| 6,023,720 A | 2/2000 | Aref et al. | |
| 6,026,452 A | 2/2000 | Pitts | |
| 6,041,359 A * | 3/2000 | Birdwell | 709/238 |
| 6,061,504 A | 5/2000 | Tzelnic et al. | |
| 6,067,107 A | 5/2000 | Travaille et al. | |
| 6,067,301 A * | 5/2000 | Aatresh | 370/418 |
| 6,067,557 A | 5/2000 | Hegde | |
| 6,085,234 A | 7/2000 | Pitts et al. | |
| 6,085,241 A * | 7/2000 | Otis | 709/223 |
| 6,112,239 A * | 8/2000 | Kenner et al. | 709/224 |
| 6,138,221 A | 10/2000 | Korst et al. | |
| 6,157,963 A | 12/2000 | Courtright, II et al. | |
| 6,192,029 B1 | 2/2001 | Averbuch et al. | |
| 6,205,475 B1 | 3/2001 | Pitts | |
| 6,240,094 B1 | 5/2001 | Schneider | |
| 6,243,761 B1 | 6/2001 | Mogul et al. | |
| 6,243,778 B1 | 6/2001 | Fung et al. | |
| 6,253,248 B1 | 6/2001 | Nakai et al. | |
| 6,292,834 B1 | 9/2001 | Ravi et al. | |
| 6,304,297 B1 | 10/2001 | Swan | |
| 6,304,906 B1 | 10/2001 | Bhatti et al. | |
| 6,317,775 B1 | 11/2001 | Coile et al. | |
| 6,374,336 B1 | 4/2002 | Peters et al. | |
| 6,378,036 B2 | 4/2002 | Lerman et al. | |
| 6,385,673 B1 | 5/2002 | DeMoney | |
| 6,408,005 B1 * | 6/2002 | Fan et al. | 370/412 |
| 6,469,982 B1 * | 10/2002 | Henrion et al. | 370/230 |
| 6,532,234 B1 * | 3/2003 | Yoshikawa et al. | 370/395.4 |
| 6,560,628 B1 * | 5/2003 | Murata | 718/103 |
| 6,731,603 B1 * | 5/2004 | Motobayashi | 370/232 |
| 6,765,868 B1 * | 7/2004 | Dunn et al. | 370/230 |
| 7,046,631 B1 * | 5/2006 | Giroux et al. | 370/234 |
| 2001/0003830 A1 * | 6/2001 | Nielsen | 709/226 |
| 2002/0143999 A1 * | 10/2002 | Yamagami | 709/249 |

FOREIGN PATENT DOCUMENTS

| | | |
|---|---|---|
| EP | 0 701 370 | 3/1996 |
| EP | 0 757 310 | 2/1997 |
| EP | 0 766 473 | 4/1997 |
| WO | 98 28915 | 7/1998 |
| WO | 99/15953 | 4/1999 |

OTHER PUBLICATIONS

"A Framework for QoS-based Routing in the Internet" —Network Working Group, Aug. 1998 http://www.ietf.org/rfc/rfc2386.txt.*

Menon, "SGI™ MediaBase: Intelligent Media Streaming for Intranets and the Internet," © 1999 Silicon Graphics, Inc., pp. 1-11.

Kamel, "A Study on Scheduling Multiple Priority Requests," © 1999 IEEE, pp. 395-399.

Reddy et al., "I/O Issues in a Multimedia System," Mar. 1994, pp. 69-74.

International Search Report, application No. PCT/US 00/27179, mailed Mar. 13, 2001.

"I/O Issues in a Multimedia System", Reddy, et al, IEEE Computer Society, Long Beach, CA, vol. 27, No. 3, Mar. 1, 1994, pp. 69-74.

Law, "The Bandwidth Guaranteed Prioritized Queuing and its Implementations," Nov. 8, 1997, IEEE Global Telecommunication Conference, 1997, vol. 3, pp. 1445-1449.

Stoica, et al., "A Proportional Share Resource Allocation Algorithm for Real-Time, Time-Shared Systems," Dec. 17, 1996, IEEE Real-Time Systems Symposium, pp. 288-299.

Sriram, "Dynamic Bandwidth Allocation and Congestion Control Schemes for Voice and Data Multiplexing in Wideband and Packet Technology," Apr. 1990, IEEE International Conference on Communications, 1990, vol. 3, pp. 1003-1009.

Chao, et al., "A New Buffer Insertion Ring with Time Variant Priority Scheme to Facilitate Real-Time Image Transmission on a High Speed Integrated Local Area Network," Proceedings from the 14$^{th}$ Conference on Local Computer Networks, 1989, pp. 212-218.

* cited by examiner

SCHEDULING STORAGE ACCESSES FOR RATE-GUARANTEED AND NON-RATE-GUARANTEED REQUESTS

This application is a continuation of U.S. Ser. No. 09/413,043, filed Oct. 6, 1999 now U.S. Pat. No. 6,721,789.

BACKGROUND OF THE INVENTION

1. Field of the Invention

This invention relates to computer data storage and server systems, and more particularly to digital video/audio storage and playback systems supporting multiple continuous media streams.

2. Description of the Related Art

Multimedia or video server systems are used in a variety of applications for the storage and playback of video, audio or other multimedia data streams. For example, multimedia servers may be used for broadcast, cable, satellite or telco solutions to distribute multimedia information to clients or consumers. Professional broadcasters and associated service providers, such as networks and affiliates or cable providers, may employ digital video servers to support high bandwidth multimedia broadcast applications including multi-channel program playout, ad insertion, and digital content management. Other applications for multimedia server systems may include computer-based training in which multimedia training materials or lectures may be stored on the server system accessed by students over a network or the internet.

Video archiving, browsing and retrieval is another multimedia server application. Various movies may be stored by the server and distributed to users upon request. Video-on-demand or video delivery systems may enable a plurality of users or viewers to selectively watch movies or other audio/video sequences which are stored on one or more video servers or media servers. The video servers may be connected through data transfer channels, such as a broadcast cable system, satellite broadcast system or the internet, to the plurality of users or subscribers. The video servers may store a plurality of movies or other audio/video sequences, and each user can select one or more movies from the video servers for viewing. Each user may include a television or other viewing device, as well as associated decoding logic, for selecting and viewing desired movies. When a user selects a movie, the selected movie may be transferred on one of the data transfer channels to the viewing device of the respective user. Multimedia servers are also found in webcasting applications in which entertainment may be multicast on the internet to different subscribers. Multimedia servers are found in numerous other applications as well.

To meet the demands of many different applications and users, it is desirable for a multimedia server system to provide flexibility and extensibility. Two important requirements for a multimedia server system are storage space and filesystem bandwidth. Multimedia data, such as full-motion digital video, requires a large amount of storage and data transfer bandwidth. Thus, multimedia systems use various types of video compression algorithms to reduce the amount of necessary storage and data transfer bandwidth. In general, different video compression methods exist for still graphic images and for full-motion video. Video compression methods for still graphic images or single video frames may be intraframe compression methods, and compression methods for motion video may be interframe compression methods.

Examples of video data compression for still graphic images are RLE (Run-Length Encoding) and JPEG (Joint Photographic Experts Group) compression. Although JPEG compression was originally designed for the compression of still images rather than video, JPEG compression is used in some motion video applications. Most video compression algorithms are designed to compress full motion video. Examples of video compression techniques are MPEG (Moving Pictures Experts Group), MPEG-2, DVI (Digital Video Interactive) and Indeo, among others.

Even with the use of compression techniques, multimedia applications may still require extremely large amounts of storage. For example, two hours of video encoded at 1 Mb per second may require roughly one gigabyte (1GB) of storage. A system supporting numerous different content may require up to several terabytes (TB) of storage. The server system must also be able to provide enough bandwidth for the various users to access selected multimedia content without overloading the storage system. For example, to support 100 simultaneous subscribers viewing multimedia content encoded at 1 Mb per second, a server may need to support a bandwidth in excess of 100 Mb per second when allowing for overhead. If enough bandwidth is not available, then some requests may have to be denied, or the play quality may suffer (video may run too slowly or may appear "jerky"). To meet such storage and bandwidth needs, a multimedia server may utilize one or more RAID storage systems. In a RAID system, for a given multimedia file, blocks of multimedia data may be stored across multiple hard disk units. The blocks may be read out or transferred to the communication network and transmitted or broadcast to the user or users. At the receiving end the blocks may be decoded for user viewing on a display device.

The use of hard disk drives to store information magnetically is well known. A single hard disk drive typically includes several rotating disks or platters upon whose surfaces information may be written or read by a read/write head. Within a hard disk drive the platters rotate together and all read/write heads typically are moved simultaneously to access different platter positions. A platter typically is formatted into concentric tracks that define collectively, platter-to-platter, a family of concentric cylinders, and into sectors that represent a portion of a track. A controller associated with the hard disk unit determines which cylinder, read/write head and sector is to be accessed for reading or writing.

The platters may also be considered as being divided into zones. Since they are physically larger, tracks in zones at the outer platter parameter contain more sectors than tracks in zones near the rotational axis of the platter. Therefore, assuming the platters rotate with a constant velocity, the data bandwidth available from the outer most zones is greater than the data bandwidth available from the innermost zones. Even with modern hard disk drives, there can be a 2-1 variation between worst case and average case disk transfer bandwidth due to sectors/track variations between outer and inner zones.

Many multimedia applications require continuous media streams in which data streams must be delivered at a specified and possibly time-varying data rates and with a specified uniformity of that delivery rate. To support continuous media streams, prior video streaming systems have been based on a constant time, variable data storage scheduler. Constant time, variable data schedulers deliver a stream at a particular bit rate by accessing the disk with a frequency that is common with all streams and varying the amount of data fetched at each period to meet the required data rate of the stream. The admission control problem for constant time, variable data disk schedulers is fairly straight forward. A new stream may be admitted if the disk can sustain the required aggregate data rate over the fixed access period. FIG. 1 illustrates a constant time/variable data rate dependent data placement/scheduling mechanism. For simplicity only two streams are illustrated. Data blocks 100 are accessed at a fixed period common to all streams. The size of the data blocks 100 is varied between different streams according to the rate required for a particular stream. As shown in FIG. 1, stream one has a larger block size and thus a higher data rate than stream two. When streams are recorded to disk using a constant/time variable data scheduling mechanism, the placement of data on the disks is rate dependent.

Constant time schedulers may have some deficiencies however. These deficiencies may include significant internal fragmentation of storage. Internal fragments occur because storage is allocated in multiples of some fixed-size block. A minimum block size is the size of the device sector, but typically the blocks may be larger to minimize the size of free block lists. Internal fragmentation may occur in every block file. For example, fifty percent of storage could be lost to internal fragmentation when the desired bit rate just exceeded what was deliverable by a certain block size per period.

Constant time schedulers may also suffer from a loss of bandwidth capability due to internal fragmentation. Internal fragmentation results in a loss of storage bandwidth because the system must fetch unused bytes.

Constant time schedulers may also suffer from significant external fragmentation of storage. Because storage is allocated and freed in variable blocks, storage can be lost for use by high bit-rate files due to external fragmentation. Some constant time systems avoid this problem by aggregating their variable data from multiple discontinuous storage blocks. However, in doing so they lose storage performance by requiring additional seeks.

Another deficiency of constant time schedulers is that they may require a more complicated file system to accommodate variable block sizes. The scan requires decision-making mechanisms to choose between best fit and first fit blocks, and between blocks on a disk's inner or outer zones, to mention only two complicating factors. Other complicating factors arise when allocating memory buffers to hold the variable-size data blocks.

Constant time schedulers result in bit-rate dependent block allocation of storage. Bit-rate dependence is inherent in constant time schedulers because the block size is chosen based on the desired stream bit rate. Thus, a file's desired streaming rate must be known prior to writing the stream to storage.

Constant time schedulers also typically lack of support for a pull model and variable bit-rate streaming. In general, because block size and placement are based on a given anticipate stream rate, accommodating variable bit streams and implementing a pull model is impractical.

While most of the above points are implementation or efficiency issues, lack of pull-model support is a functional issue with significant implications. It makes non-real-time migration of video files difficult. It also complicates solutions in cases where other devices are unable to slave to a server's clock or are forced to slave to another clock source, such as where encoders and decoders in a broadcast environment are slaved to a "studio clock." Non-real-time migration and providing input and output to externally clocked devices are important requirements for the broadcast environment.

Thus it is desirable to have a multimedia server and storage system that may guarantee performance on an arbitrary mix continuous multimedia streams including reads, writes, varying bit rates, single files, and multiple files. A technique for controlling stream admission is desirable to ensure that current stream rates may be guaranteed. Efficient high utilization of disk bandwidth is also desirable.

SUMMARY

A multimedia storage manager may operate by associating a ring of data buffers between the requestor of continuous media and the disk subsystem. The number of buffers in the ring may be a function of a contracted guarantee rate of the associated media stream, configurable parameters of the disk scheduling system, and service characteristics of the disk system.

This ring of N buffers may be used to hold the next N blocks of the continuous media stream to be accessed by the requester. Once a buffer in the ring has its data consumed by the requester, the now empty buffer along with a deadline time is queued with the disk scheduler. The deadline time indicates the latest time when the buffer can be filled and meet the guaranteed rate requirement of the stream. It is calculated simply as currentTime+(N−1)*bufTime, where bufTime is the minimum time in which the requestor can consume a buffer without exceeding the contracted rate guarantee.

Simultaneously with guaranteed rate requests being queued with the disk scheduler, prioritized, but non-guaranteed rate requests are also queued. Non-guaranteed rate requests do not carry deadlines, but do carry priorities.

In a preferred embodiment, the disk scheduler issues the queued requests to disk in an order which meets the deadlines associated with the request, obtains a high proportion of the disk system bandwidth, and allocates residual disk bandwidth after guaranteed requests to non-guaranteed requests in a manner consistent with their associated priorities.

The storage manager places requests from continuous media requestors into a earliest deadline ordered queued (the "deadline queue"), and it places prioritized non-guaranteed rate requests into a separate highest priority ordered queue (the "priority queue").

The disk scheduler may also maintain a third list of disk requests. This list has requests ordered by the position of the requested data block on the disk device. This list is referred to later as the "seek reorder queue". The seek reorder queue may have fixed maximum size that is a configurable parameter of the system. Requests from the two queues described above are migrated to this list.

Requests are migrated from the deadline and priority queues to the seek reorder queue in a "cycle". A cycle is of a fixed number of requests and within the cycle "slots" are assigned to either the deadline queue or the priority queue in proportion equal to the desired allocation of disk bandwidth between guaranteed and non-guaranteed access. The slots allocated to each use are evenly distributed through the cycle.

Requests from the deadline and priority queues are migrated to the seek reorder queue whenever the seek reorder queue is not filled to its maximum size. Each migration is done from the queue indicated by the current slot of the cycle and then the cycle advances to the next slot. If the queue indicated by the slot is empty, then an entry from the alternate queue is chosen if it is non-empty. The migrated entry is ordered in the seek reorder queue such that all requests to one side of it refer to data blocks with disk addresses greater than or equal to its own and all blocks on the other side in the list have data blocks with disk address less than or equal to its own.

The seek reorder queue is concurrently traversed by a thread that moves continuously in one direction (i.e. in increasing or decreasing disk addresses) until no further entries exist on the list, it then reverses direction and resumes.

This thread at each step issues the disk request to the disk subsystem and advances to the next request when the previously issued request has been completed by the disk system.

In a preferred embodiment, the storage manager ensures that bandwidth is allocated as desired between guaranteed and non-guaranteed rate requesters, allows for prioritized non-guaranteed access, and reduces average seek distance as disk load increases.

The system also addresses admission control (e.g. determining if an additional guaranteed rate requestor can be accommodated without impacting service to existing guaranteed rate requestors) and determination of the appropriate number of buffers in a ring for a desired guaranteed stream access rate.

Admission control may be addressed by characterizing the disk system performance with a synthetic load that reflects the characteristics of a typical load. Construction of a representative load may be simplified by constraining the file system to allocate sequential blocks in a "zoned random" manner: the disk block address range is divided into two halves, sequential file block allocations are chosen from random positions within a zone and then alternating between the two zones. In a preferred embodiment, this process is followed because disk systems have performance variations with respect to block address. Allocating from alternate "zones" ensures that disk performance is approximately equal both across different files and across positions within a single file. The synthetic load is now a single zoned allocation sequence which is sufficiently representative of the true load (and aggregation of multiple of zoned allocations). Disk performance may be characterized with this load and derated to provide margin. The derated bandwidth value may then be multiplied by the fraction of total bandwidth allocated in the "cycle" process to guaranteed rate requesters. This results in the maximum admission bandwidth. Guaranteed rate requestors may now be admitted until they have consumed the entire admission bandwidth.

Determination of the appropriate number of buffers in the buffer ring may be done empirically. This may be done by running a collection of guaranteed rate streams, all contracted for the same rate. The rate is chosen so that the collection of streams exactly consumes the entire admission bandwidth. All streams are initiated against the scheduler simultaneously. Ring buffers are then sized to assure that all deadlines are met with a stated margin. The margin may be a configurable parameter Generally speaking, one embodiment includes a system for scheduling storage accesses of multiple continuous media streams. The system may include a plurality of media stream clients. Associated with each media stream client is one of a plurality of media stream managers. Each media stream manager maintains a ring of buffers configured to buffer media stream data between its associated media stream client and one or more storage systems. A different deadline queue may be associated with each one of the storage systems. Each deadline queue may be configured to queue buffer requests from the media stream managers. Each buffer request may include a deadline by which the buffer request must be fulfilled by the corresponding storage system. Each media stream manager may be configured so that once one of its buffers is consumed by the associated media stream client, the media stream manager submits a buffer request and deadline for that buffer to the appropriate deadline queue. Buffer requests may be ordered in each deadline queue from earliest to latest deadline. Each media stream manager may be configured to provide a guaranteed maximum media stream rate to its associated media stream client. The system may also include an admission controller configured to negotiate a maximum media stream rate with each media stream client. The admission controller may allow additional media stream clients only if negotiated maximum media stream rates can be maintained for all current media stream clients.

For each ring of buffers, each buffer is consumed by its associated media stream client one after another in a circular order. Each buffer may be equally sized to hold one block of data, where data is accessed in the storage systems according to a block. Each ring of buffers may contain a number of buffers, where the number is chosen according to a maximum stream rate requested by the associated media stream client. The number is chosen to provide just enough buffers to avoid underrun at the maximum stream rate. The system may also include a bandwidth allocator configured to allocate a set portion of storage system bandwidth to request from the deadline queue for a storage system and the remaining storage system bandwidth to non-rate-guaranteed requests.

One embodiment may include a method for scheduling storage accesses of multiple continuous media streams. The method may include establishing a guaranteed maximum stream rate for each of a plurality of multimedia streams. The method may further include establishing a ring of buffers for each multimedia stream with each multimedia stream fulfilling multimedia data requests from its associated ring of buffers. As each buffer in one of the ring of buffers is consumed, the method includes queuing a request for that buffer in a deadline queue associated with the storage system from which the request is to be satisfied. For each deadline queue the method includes issuing requests from the deadline queue to the associated storage system. The request with the earliest deadline is issued first. Queuing the request may include calculating a deadline time indicating the latest time by which the buffer request can be fulfilled and still meet the corresponding guaranteed maximum stream rate.

An embodiment may include a method for managing a multimedia data stream. The method may include receiving a request from a stream requestor to establish a multimedia data stream to access a multimedia file stored on a storage system. The method may include linking to the multimedia file and creating a ring of buffers. The method may further include initially filling the ring of buffers with multimedia data for the stream and then streaming multimedia data between the multimedia file on the storage system and the multimedia stream requester. Streaming multimedia data may include consuming one of the buffers in the ring of buffers and then generating a request and a deadline for the just consumed buffer. The deadline may indicate the latest time the request must be fulfilled in order to prevent buffer underrun. The streaming then includes issuing the request and deadline for the just consumed buffer to a deadline queue. The request may be ordered in the deadline queue according to the deadline. The next buffer in the ring of buffers may then be consumed and the process repeated.

A system for managing storage accesses for rate guaranteed continuous multimedia data streams and non-rate-guaranteed storage requests may include a plurality of rate guaranteed requesters for multimedia streams and one or more non-rate guaranteed requesters. A disk scheduler may also be included. The disk scheduler may have a guaranteed rate queue for queuing storage requests from the rate guaranteed requestors and a non-rate-guaranteed queue for queuing requests from the non-rate-guaranteed requestors. The disk scheduler may also include a bandwidth allocator coupled to the guaranteed rate queue and the non-rate-guaranteed queue and further coupled to a storage system. The bandwidth allocator may be configured to allocate bandwidth of the storage system between the guaranteed rate queue and the non-rate-guaranteed queue according to a predetermined ratio. The rate guaranteed requestors may be limited so that an aggregate of maximum stream rates guaranteed for each rate guaranteed requestor does not exceed the portion of the bandwidth allocated to the guaranteed rate queue.

Requests may be ordered in the guaranteed rate queue according to a deadline where the deadline for each request indicates a latest time by which that request must be fulfilled to meet a guaranteed maximum stream rate for the corresponding multimedia data stream. Requests may be ordered in the non-rate guaranteed queue according to a priority where the bandwidth allocator is configured to migrate the request with the highest priority from the non-rate-guaranteed queue. The system may also include a buffer ring for each multimedia data stream from one of the rate guaranteed requesters. The buffer ring may buffer multimedia stream data between an associated rate guaranteed requesters and the disk scheduler. The buffer ring may contain a number of buffers chosen to prevent buffer underrun at a guaranteed maximum stream rate. The buffers of each buffer ring may be consumed by the associated rate guaranteed requestor one after another in a circular order. As each buffer is consumed a request and a deadline for the just consumed buffer may be issued to the guaranteed rate queue.

A method for managing storage accesses for rate guaranteed continuous multimedia data streams and non-rate-guaranteed storage requests may include allocating a portion of the storage systems bandwidth to stream requests from rate guaranteed requesters and allocating the remaining portion of the storage systems bandwidth to request from non-rate-guaranteed requestors. Storage requests from rate guaranteed requestors may be queued in a guaranteed rate queue and storage requests from non-guaranteed rate requestors may be queued in a non-rate guaranteed queue. The method further includes selecting either the guaranteed rate queue or the non-rate-guaranteed queue according to the bandwidth allocation in order to migrate one of the requests to the storage system. Each guaranteed rate requestor may request access for a multimedia stream having a maximum guaranteed rate. The method includes limiting the number of multimedia streams so that the aggregate of the maximum guaranteed rate for each stream does not exceed the bandwidth allocated to stream requests from rate guaranteed requestors. Unused bandwidth for guaranteed rate requests may be dynamically reallocated to non-rate-guaranteed requests and vice versa.

A system and method may be provided for configuring or tuning a media storage system. The method may include characterizing a maximum sustainable throughput for the media storage system. The maximum sustainable throughput may be decreased by a primary derate parameter to obtain a primary throughput. The method may further include determining sizes for buffer units at different media stream rates where during operation each buffer unit is used for buffering a media data stream between a media stream requestor and the storage system. The buffer unit sizes may be determined by generating stream simulators sufficient to consume the primary throughput and then optimizing the buffer sizes to prevent underruns for the stream simulators. This may be repeated at different stream rates in order to determine a table of buffer sizes versus stream rates. The method may also include decreasing the primary throughput to obtain a maximum system bandwidth which, during operation of the system, sets an upper limit on admission of streams. The amount by which the primary throughput is decreased for this purpose may be determined by a configurable secondary derate parameter.

When buffer sizes are determined, a prefill margin parameter may be set by which request deadlines must be met. Also, an available rate parameter may be set to proportion available bandwidth between rate guaranteed streams and non-rate guaranteed requests. The proportion allocated for rate guaranteed requests may be used to determine buffer sizes that are able to meet the configured prefill margin. Another parameter may be configured to set the length of a seek reorder queue that orders storage system requests according to their physical storage address. This parameter allows a tradeoff between seek efficiency and variability in service time. A higher variability in service time may require larger buffer ring sizes. Also, the block size by which data is accessed in the storage system may be configured.

BRIEF DESCRIPTION OF THE DRAWINGS

Other objects and advantages of the invention will become apparent upon reading the following detailed description and upon reference to the accompanying drawings in which.

Figure 1:
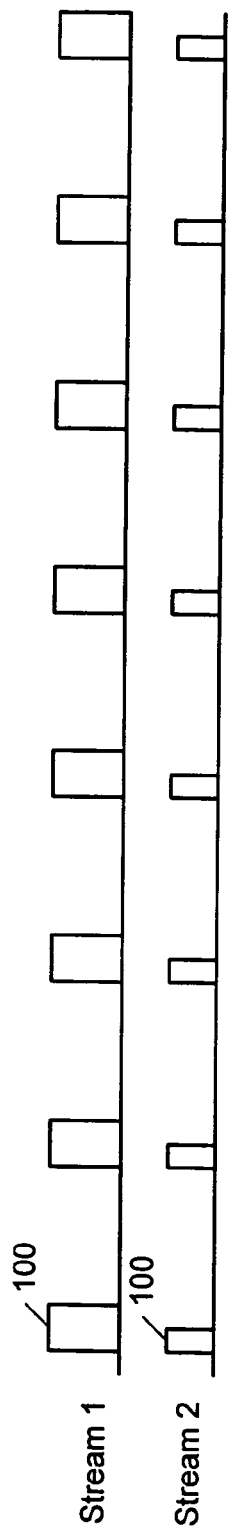
FIG. 1 illustrates a constant time/variable data rate dependent data placement/scheduling mechanism.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2:
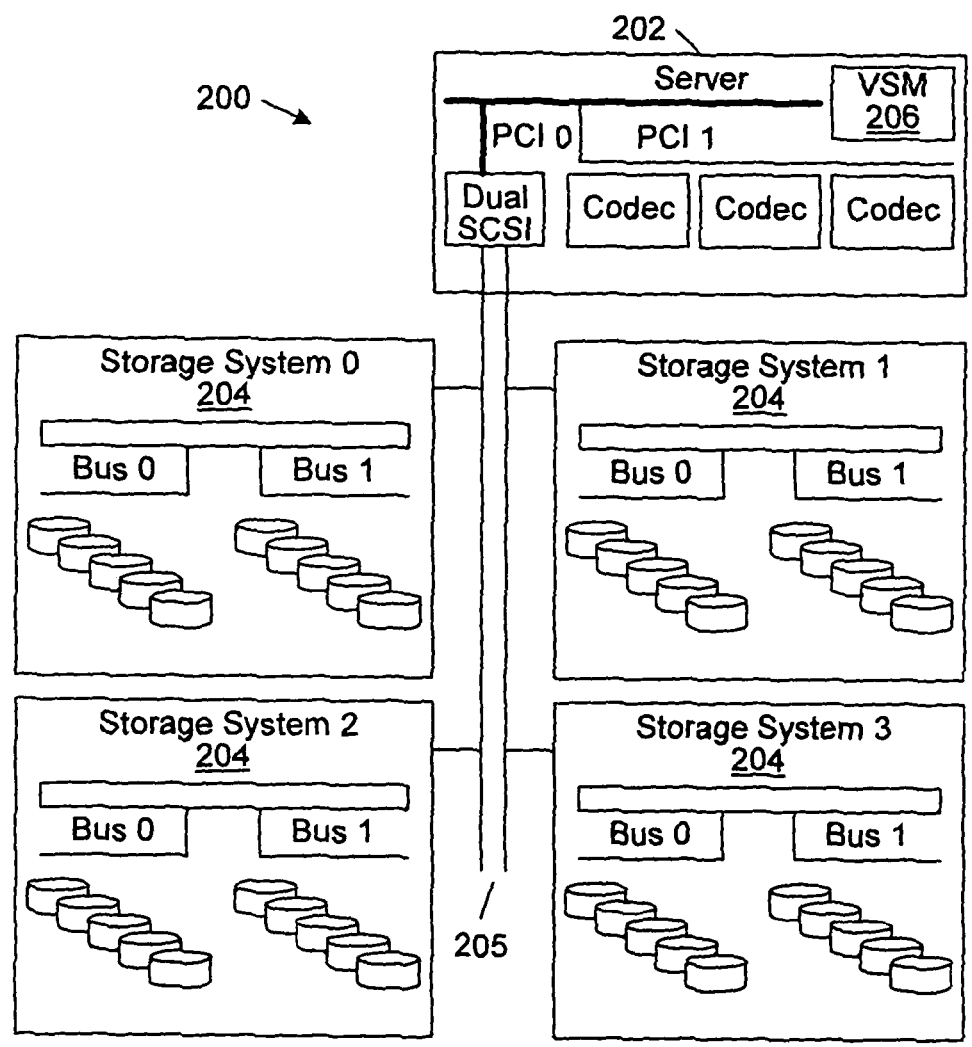
FIG. 2 is an illustration of a video server and storage system.

Referring now to FIG. 2, a video server and storage system 200 is illustrated. System 200 includes server 202 and storage systems 204. The storage systems 204 may be connected to the server 202 by one or more buses 205. The server may include one or more processors (not shown) which may communicate with the storage systems 204 via a peripheral bus, such as one or more PCI buses and one or more SCSI interfaces. The server 202 may also include a number of codecs for encoding and decoding multimedia data streams. The codecs may also be coupled to one or more PCI buses. Each storage system 204 may include one or more RAID systems as shown.

In order to support multiple continuous media streams in which data streams are delivered at a specified and possibly time-varying data rate, the server 202 includes a video storage manager 206. The video storage manager controls the storage and access of multimedia streams on the storage systems 204. In a preferred embodiment, multimedia files are stored via the video storage manager 206 in high quality MPEG-2 format, although other suitable compression formats may be used. Clients or requestors for a multimedia stream contract with the video storage manager 206 for access to a file at a desired bit rate. The video storage manager 206 assesses available storage bandwidth and available buffer memory to determine whether or not the request can be met. Once the video storage manager has established that the request can be accommodated, the client is given access to the file at any bit rate up to the contracted rate. If the request exceeds available storage bandwidth and/or buffer memory is exhausted, the video storage manager must reject the request and the client is free to adjust and/or resubmit the request at a later time. By providing a guaranteed stream rate the video storage manager fully supports variable bit rate accesses in addition to constant bit rate accesses. A client may arbitrarily vary the rate of access to a file from zero bits per second to any point up to the contract rate. This flexibility supports a number of features including frame accurate initiation and jog/shuttle functionality.

Multiple different clients may request different streams at different bit rates from the video storage manager. These streams may be an arbitrary mix of reads, writes, stream rates and files accessed. Each stream may have a different contract rate and an individual stream may arbitrarily range in rate up to the contract rate wherein the total aggregate for all stream rates does not exceed the total aggregate streaming capacity of the server system. There is no requirement that all streams be of the same bit rate, or that the bit rate of a stream be chosen from a set of discrete allowable rates. The video storage manager also permits clients to access the same files, different files, or any combination in-between. As will be described below, the video storage manager provides this flexibility without impacting on server aggregate bandwidth.

Figure 3:
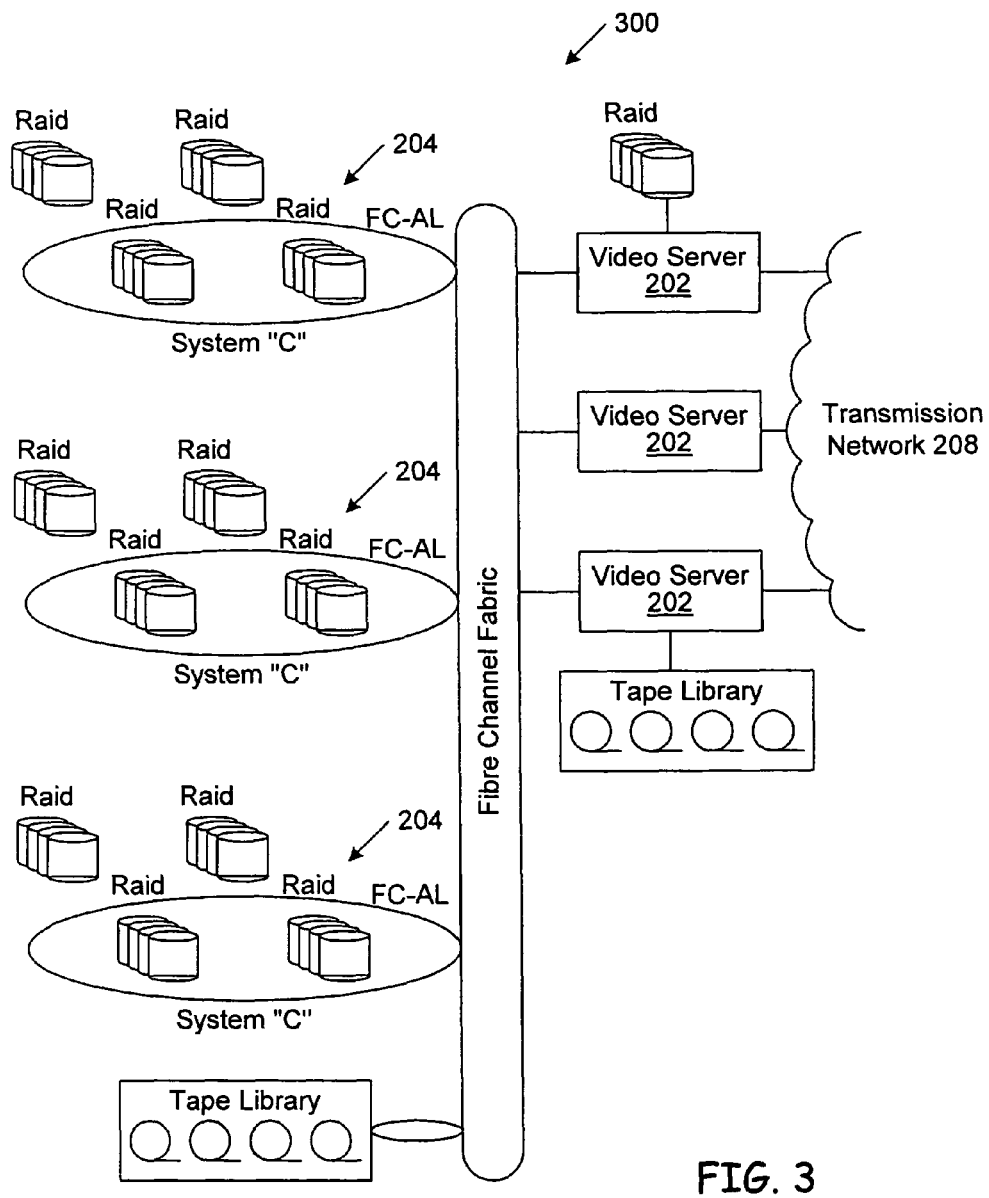
FIG. 3 is an illustration of a distributed multimedia file system employing a number of video servers and files systems.

Turning now to FIG. 3, a distributed multimedia file system 300 is illustrated employing a number of video servers 202 and files systems 204. In this embodiment the files systems 204 communicate with video servers 202 via fibre channel. Each storage system 204 may include a number of RAID systems linked on a fibre channel arbitrated loop (FC-AL). Each video server 202 may also connect to its own local file system or tape library, for example. In addition, other storage systems, such as a tape library, may be accessible to the system on the fibre channel. Clients may request multimedia streams to be sent on transmission network 208. Transmission network 208 may be a computer network, the internet, a broadcast system or any other suitable transmission medium for multimedia streams. A video storage manager executing on one or more of the video servers controls the initiation and addition of multimedia streams for accessing files on storage systems 204. The video storage manager manages multiple continuous media streams to be delivered through a wide range of hardware interfaces, such as MPEG encoders and decoders, DVB multiplexors, ATM, SONET, and ethernet, to transmission network 208.

The video storage manager as employed in systems such as illustrated in FIGS. 2 and 3, addresses how to schedule disk or storage accesses for multiple continuous sequential media streams in a manner that guarantees data for all continuous media streams and provides an accurate mechanism for determining whether a new request for guaranteed rate access can be accommodated.

Figure 4:
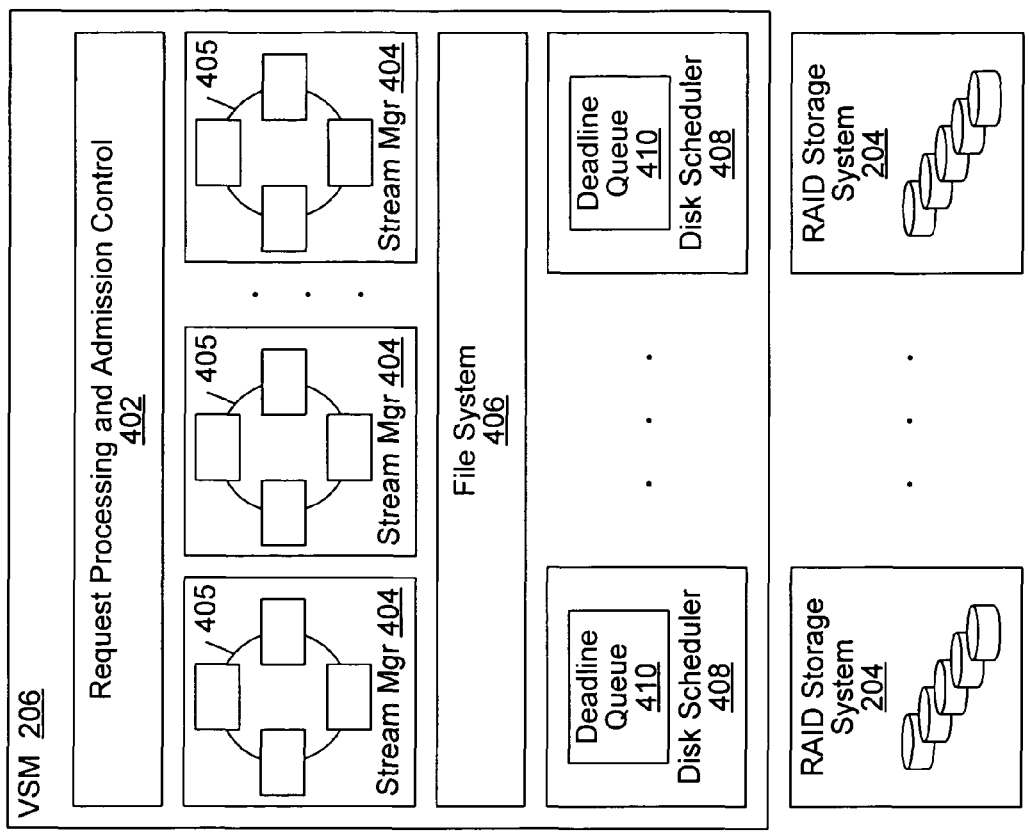
FIG. 4 is a detailed diagram of a video storage manager.

Turning now to FIG. 4, a detailed diagram of a video storage manager 206 is shown. The video storage manager 206 includes a request processor 402 which interfaces client requests to stream managers 404. Each stream manager 404 maintain a buffer ring 405. A separate stream manager 404 corresponds to each continuous multimedia stream. A file system 406 is provided for mapping stream accesses to the storage systems 204. Disks schedulers 408 are provided for each storage system 204 to manage to flow of storage accesses to each storage system. Each disk scheduler may include a deadline queue for 410, as described in more detail below.

The video storage manager, file system, and disk scheduler place stream data on the storage systems in a manner that is completely independent of the inherent bit rate of that material. This feature provides for additional flexibility in that clients may transfer content on and off the video storage manager file system with guaranteed rate service at data rates many times higher (or lower) than the inherent rate of the stream data. The video storage manager, file system, and data placement mechanism is a fixed block size mechanism. For example, data is transferred to or from the storage systems in a constant block size. In a preferred embodiment a block size of 256 kilobytes may be chosen. The video stream manager may provide for configuration of the block size during system initiation or configuration. The fixed block size mechanism ensures that no external fragmentation of storage occurs and that internal fragmentation occurs only at the last block of the file (since a file is unlikely to end exactly at a block boundary). Unlike rate-dependent, variable block size mechanisms, which suffer from both external fragmentation and varying levels of per block internal fragmentation that results in great variations and storage requirements for a particular file depending on stream rate and current file system contents, the video storage manager's rate independent fixed block size mechanism ensures predictable storage requirements for any file regardless of rate or current file system contents.

Figure 5:
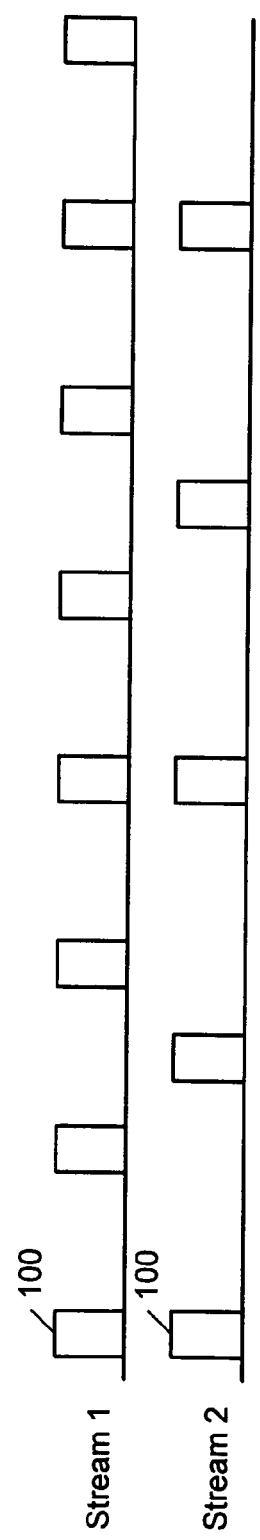
FIG. 5 illustrates one example of a constant data, variable time rate-independent placement mechanism of the video storage manager for two simultaneous continuous media streams.

Turning briefly to FIG. 5, one example of the constant data, variable time rate-independent placement mechanism of the video storage manager is illustrated for two simultaneous continuous media streams. As shown, the data block size is fixed for all media streams, but the time at which a data block is accessed varies for each stream according to the desired bit rate.

One problem that arises from a constant data (fixed block), variable time access scheduling mechanism is that multiple streams, each with its own frequency and phase of storage accesses, make requests to the storage system and the interaction of these access patterns results in peaks and lulls in the storage activity. The different frequency and phases of storage accesses by the different streams results in times in which numerous accesses may be pending at once and other times in which very few accesses may be pending. One solution to this problem is to simply require the storage systems to support the peak rate of activity, however, this solution is clearly not cost effective.

Referring back to FIG. 4, the virtual storage manager of the present invention addresses the above-noted problem by leveling storage activity by introducing a ring of buffers between each client and the file system. Each media stream is associated with a different buffer ring 405 managed by a stream manager 404. Thus, the stream manager 404 associates a ring of data buffers between the requester of continuous media and the disk subsystems. The number of buffers in a ring is determined according to the contracted guarantee rate of the associated media stream and characteristics of the storage system so that the guaranteed rate is always met. The buffer rings 405 exploit the fact that video streaming is inherently sequential and lets the file system pre-queue storage requests. This approach allows future requests to be satisfied during lulls, shifting the load from peaks to valleys and smoothing storage activity over time.

Each ring 405 of N buffers is used to hold the next N blocks of the continuous media stream to be accessed by the requester. Once a buffer in the ring has its data consumed by the requester, an access to fill the now empty buffer is queued to the appropriate disk scheduler 408 in order to fill the empty buffer with the next block for the media stream. Requests to fill (or empty) buffers of buffer rings 405 are mapped by file system 406 to the appropriate disk scheduler 408. File system 406 maps logical blocks to physical blocks in the storage systems 204. The file system 406 may maintain a map of logical to physical block locations (e.g. an inode). Because requests for multiple streams may be queued in each disk scheduler 408, the system must ensure that future request from one stream are not fulfilled before more urgent requests from another stream so that the guaranteed rate may be maintained for each stream. To accomplish this goal deadlines are associated with each request submitted to the storage a system. The system calculates the deadline to coincide with the time a buffer will be needed by noting the stream rate block size and the number of existing unconsumed buffers. When a request for an empty buffer is queued, a deadline time is queued with the request in the appropriate deadline queue 410 in the disk scheduler 408. The deadline time indicates the latest time when the buffer can be filled and still meet the guaranteed rate requirement of the particular stream. The deadline time is calculated as: current_time+(N−1)*buff_time, where N is the number of buffers in the buffer ring 405 and buff_time is the minimum time in which a requestor can consume a buffer without exceeding the contracted rate guarantee. The disk scheduler 408 must now issue the queue request to the particular storage system 204 in an order which meets the deadlines associated with the requests. The disk scheduler places requests from continuous media requesters into each deadline queue 410 and maintains an order of earliest to latest so that requests with the earliest deadline are satisfied first.

In order for the system to meet a stream's deadline it must set up a sufficiently large buffer ring to ensure that any request can be queued with the storage system far enough in advance of its deadline so that the worst possible service time for the request will not exceed the deadline. Because worst case service time is a function of the aggregate load on the system, and the aggregate load is a direct result of the aggregate stream rate (independent of the actual stream rate mix), buffer ring size for a particular stream on a given storage system is a function of that particular stream's rate and is independent of the stream rates of other streams in the mix. Given this independence, appropriate ring sizes for various stream rates may be generated at storage characterization time as detailed further below.

Figure 6:
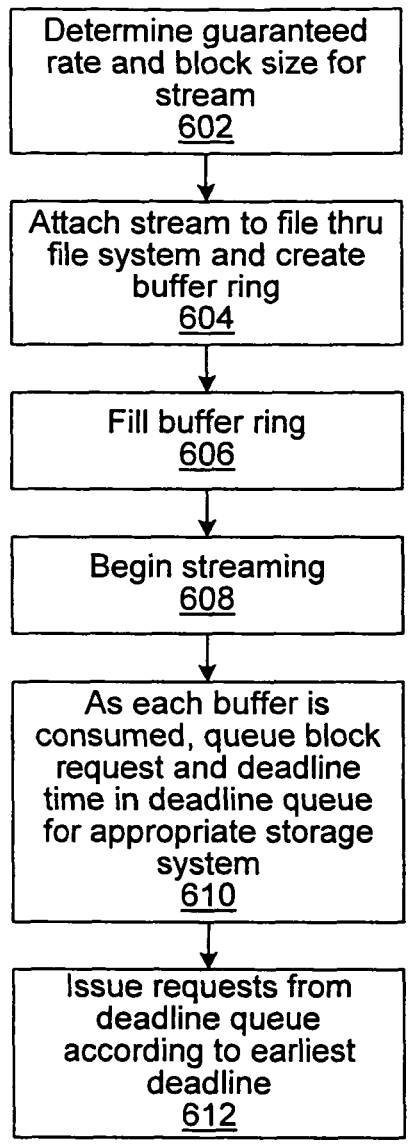
FIG. 6 is a flow chart illustrating a constant data, variable time access mechanism employing buffer rings and deadline queues.

Turning now to FIG. 6 a flow chart is provided illustrating the constant data, variable time access mechanism employing buffer rings 405 and deadline queues 410. When a new stream is initiated, the stream manager for the new stream determines the guaranteed stream rate and the block size for the stream as indicated at 602. The stream is attached to the requested file through the file system 406 and the stream manager 404 creates the buffer ring 405 for the new stream. Requests for blocks from the associated file are then issued to the appropriate storage systems to fill the buffer ring. Each buffer may be sized for one block. After the buffer ring is filled (606) streaming may begin as indicated at 608.

As each buffer is consumed by the stream requester, a block request is issued along with a deadline time to fill the now consumed buffer, as indicated at 610. The block request and deadline time are queued in the deadline queue 410 for the appropriate storage system according to where the requested block is located. The requests are ordered in the deadline queue from earliest to latest deadline time. Requests are issued from the deadline queue according to the earliest deadline as indicated at 612. During streaming the buffers of the buffer ring are accessed one after another in a circular manner. The deadline time assures that each buffer is filled before it is needed by the stream requester according to the guaranteed rate. The buffer ring and associated deadline times take advantage of the inherently sequential nature of multimedia streaming to pre-queue storage requests. This allows future requests to be satisfied during lulls of storage activity thus shifting the load from peaks to valleys and smoothing storage activity over time. Note that while FIG. 6 has been described in terms of stream read requests, the same mechanism may be employed for write stream requests. As each buffer is filled with a block of stream data a request and deadline may be queued in a deadline queue to write the block into the storage system.

The video storage manager 206 supports a plurality of different media stream clients at different rate guarantees. A different media stream manager 404 and ring buffer 405 may be provided for each stream. A separate disk scheduler 408 and deadline queue 410 are provided for each storage system 204. Thus, each deadline queue 410 may include requests corresponding to several different media streams. The deadline times for each request in the deadline queues 410 are all calculated relative to a common current time so that the earliest deadline from any requester stored in a particular deadline queue is issued first. The time between requests being satisfied for any particular stream varies depending upon the number of other pending requests, however, the associated deadline time assures that the rate guarantee will be met.

In addition to providing for rate guaranteed continuous media streams, it may be desirable for a multimedia server to provide access to data stored in the storage systems in a prioritized but non-late guaranteed manner. Such accesses should not impact the guarantees made for the continuous rate-guaranteed media streams. For example, an NFS or FTP requester may wish to access a file. Typically such accesses are non-real-time and no rate guarantee is required. Such accesses may be satisfied using residual disk bandwidth available after all guaranteed rate accesses are satisfied. Any storage bandwidth that remains after all guaranteed rate requests have been met is allocated to a general pool. Available bandwidth clients may access this bandwidth on a first come, fist served basis. The video storage manager dynamically determines the amount of available bandwidth. Any bandwidth from an unused guaranteed rate contract may become part of the pool of available bandwidth.

Figure 7:
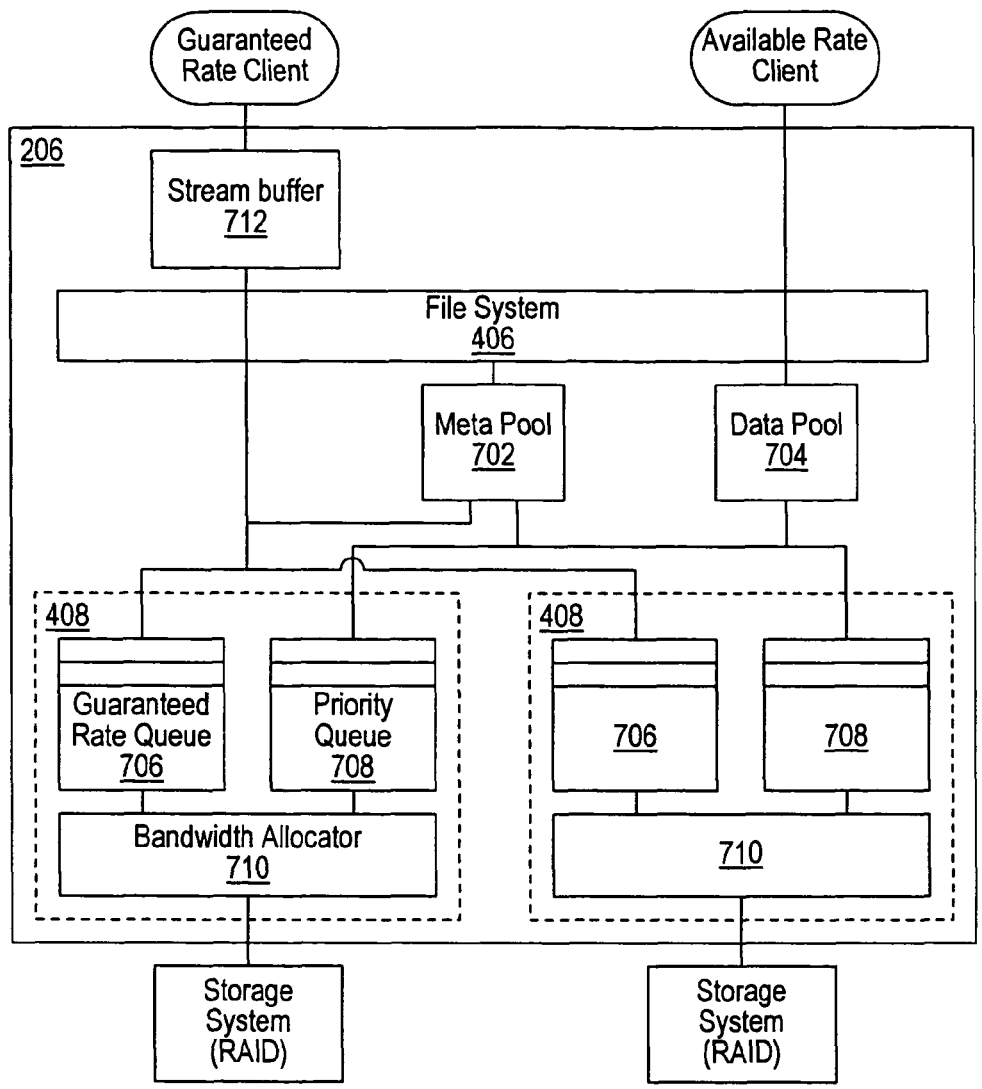
FIG. 7 illustrates a system which provides for both guaranteed rate streams and non-rate-guaranteed available rate accesses.

Turning now to FIG. 7 a system is illustrated which provides for both guaranteed rate streams and non-rate-guaranteed available rate accesses. As shown in FIG. 7 the video storage manager 206 may accept requests from both guaranteed rate clients and available rate clients. A stream buffer 712 may be associated with each guaranteed rate client. In a preferred embodiment, each stream buffer 712 is a buffer ring as described in regard to FIGS. 4 and 6. Guaranteed rate requests are mapped by file system 406 to an appropriate disk scheduler 408 and queued in a guaranteed rate queue 706. In a preferred embodiment the guaranteed rate queue is a deadline queue as described in regard to FIGS. 4 and 6. Available rate requests that are non-rate guaranteed are also mapped by file system 406 to the appropriate disk scheduler for the storage system in which the requested data is located. A data pool 704 may be provided as a shared buffer for the available rate requests. Available rate requests are queued in a priority queue 708 associated with each storage system. Another source of file requests may be the file system 406 itself. These requests may include requests for metadata required to support the various data streams (e.g. blocks that holds lists of blocks to stream, such as indirect blocks). These type of metadata requests may be time critical in that streaming will stop if a stream pointer block (indirect block) pointing to the next data block to the stream is unavailable. Thus, request for time critical metadata also carry deadlines and may be scheduled directly along with streaming data requests in the guaranteed rate or deadline queue 706. The file system constantly monitors its progress by means of the current indirect block. At an appropriate threshold it calculates a deadline and schedules the fetch of the next indirect block from the storage system. Other metadata requests may be non-critical such as other types of file management and read and write operations unrelated to streaming (e.g. listing files in the file system). These non-time-critical metadata requests are queued in the priority queues 708. A metadata pool 702 may be associated with file system 406 from which the metadata requests are issued.

Although other metadata requests and available bandwidth requests do not have strict service time requirements, they may have a priority relationship. For example, metadata writes may be considered the highest priority because their completion may be essential for closing a particular stream episode. Metadata reads may be next in priority to ensure timely processing of file lists, file creations, etc. Available I/O requests may have the lowest priority and may be filled when resources are available. Requests in the priority queues are ordered from highest to lowest priority.

The disk scheduling mechanism issues the queued requests to the storage system in an order which meets the deadlines associated with the requests and also allocates residual bandwidth after guaranteed requests to non-guaranteed requests in a manner consistent with their associated priorities. A bandwidth allocator 710 may be employed to allocate a certain portion of storage bandwidth to guaranteed rate requests and the remaining bandwidth portion to non-guaranteed priority requests. At storage characterization time a configurable percentage of a storage system's bandwidth is reserved for honoring the non-guaranteed priority requests. For example, 90 percent of the bandwidth may be reserved for the guaranteed rate requests from guaranteed rate queue 706 and the remaining 10 percent allocated to non-rate guaranteed requests from priority queue 708. Based on the percentages reserved for guaranteed and non-guaranteed requests, the disk scheduler chooses a request from one or the other queue to hand off to the operating system to be satisfied from the storage system. When the chosen request queue is empty, the scheduler attempts to de-queue a request from the other queue thus allowing both non-guaranteed and guaranteed requests to absorb unused storage bandwidth.

Figure 8:
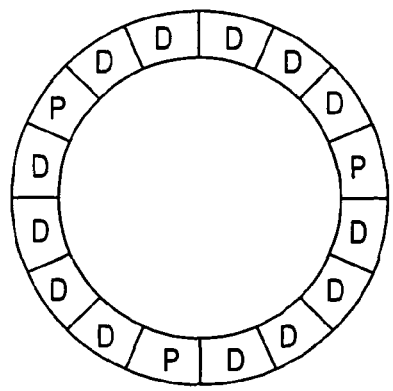
FIG. 8 illustrates an example of a cycle by which requests are migrated from the deadline and priority queues to the storage system.

In a preferred embodiment requests are migrated from the deadline and priority queues to the storage system according to a cycle. An example of a cycle is shown in FIG. 8. A cycle is of a fixed number of slots with each slot assigned to either the deadline queue or priority queue in proportion equal to the desired allocation of disk bandwidth between guaranteed and non-guaranteed accesses. In FIG. 8, slots marked with a D point to the deadline queue and slots marked with a P point to the priority queue. The slot is repeatedly traversed and a request is chosen from one of the queues according to the current slot. In the example of FIG. 8, the bandwidth is proportioned so that the disk scheduler will first look to the deadline queue for 13 out of every 16 storage accesses and first look to the priority queue for the remaining three out of every 16 accesses. This allocation is merely one example and in a preferred embodiment the allocation may be nine out of ten slots pointing to the deadline queue and one out of every ten slots pointing to the priority queue. In a preferred embodiment the slots allocated to each use are as evenly distributed as possible throughout the cycle.

In a preferred embodiment requests from the deadline and priority queues are migrated to the storage system according to the current slots and the cycle then advances to the next slot. If the queue indicated by current slot is empty then an entry from the other queue is chosen if it is not empty. Therefore, non-rate guaranteed requests may actually achieve more when their allocated bandwidth if the full rate guarantee bandwidth through the deadline queue is not being utilized.

Figure 9:
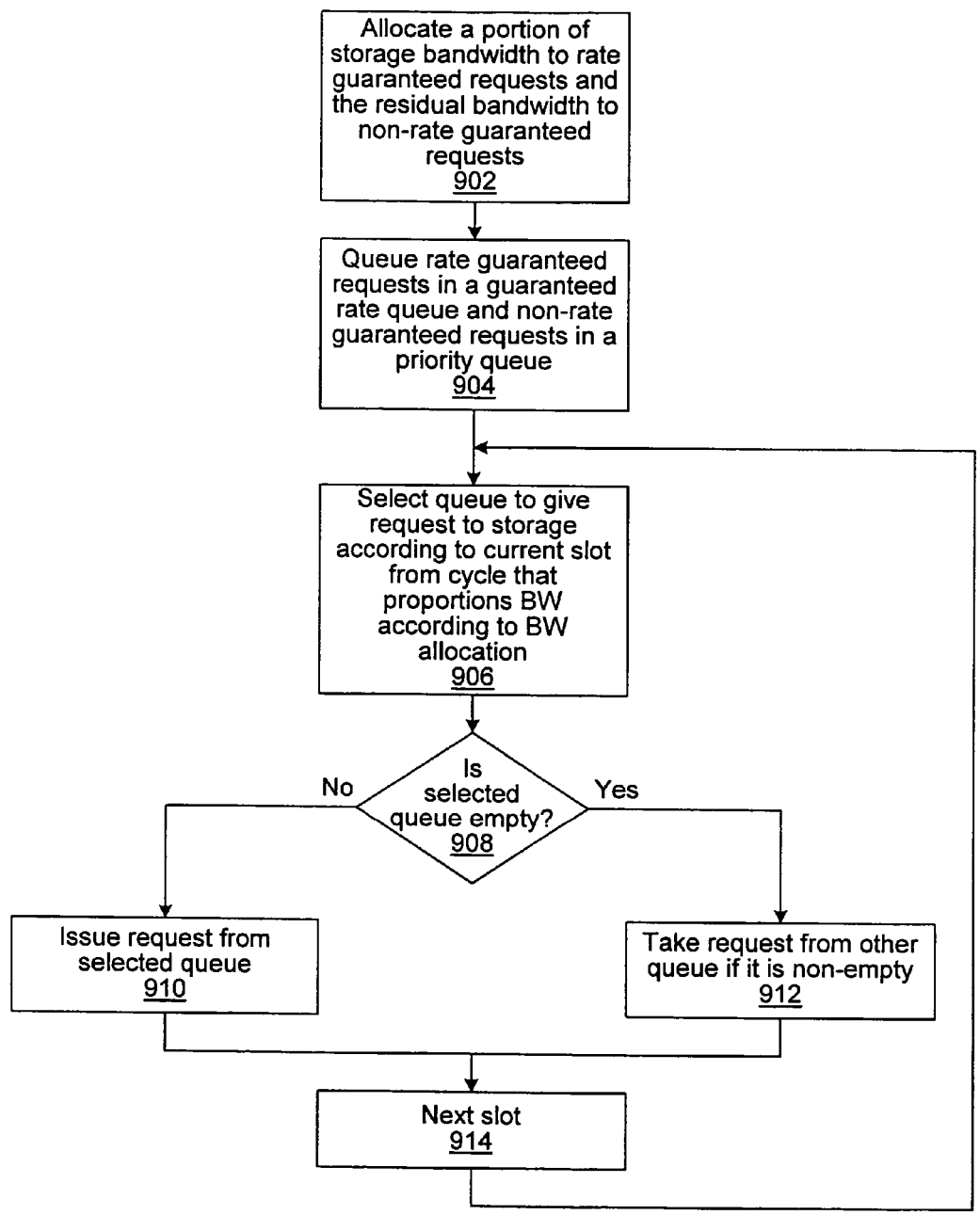
FIG. 9 is a flow chart illustrating a method for providing storage access for multiple continuous media streams with a rate guarantee and storage access for non-rate guaranteed requests.

Turning now to FIG. 9 a flow chart is provided illustrating a method for providing storage access for multiple continuous media streams with a rate guarantee and storage access for non-rate guaranteed requests. A portion of the storage bandwidth is allocated to rate guaranteed requests and the residual bandwidth is allocated to non-rate guaranteed requests, as indicated at 902. Rate guaranteed requests are queued in a guaranteed rate queue and non-rate guarantee requests are queued in a priority queue, as indicated at 904. The rate guaranteed requests are entered into and issued from the rate guaranteed queue in a manner to ensure that they are satisfied in a timely fashion to meet the particular rate guaranteed for each stream. The non-rate-guaranteed requests may be ordered in the priority queue so that higher priority requests are satisfied before lower priority requests. The system then selects a queue to issue a request to the storage system according to a current slot from a cycle that proportions the storage bandwidth according to the bandwidth allocation, as indicated at 906. If the selected queue contains an entry, then that request is issued from the selected queue, as indicated at 908, 910 and 912. If the selected queue is empty, then the system looks to the other queue for a request to issue, as indicated at 908 and 914. If the other queue is not empty, then an entry is removed and issued, as indicated at 916 and 912. The system then traverses the cycle to the next slot, as indicated at 918, and repeats the queue selection process. If the other queue is empty at 914, the process is repeated until a queue is found containing an entry. In one embodiment, the slot is not advanced if both queues are empty. Alternatively, the slot may be advanced if both queues are empty.

Figure 10:
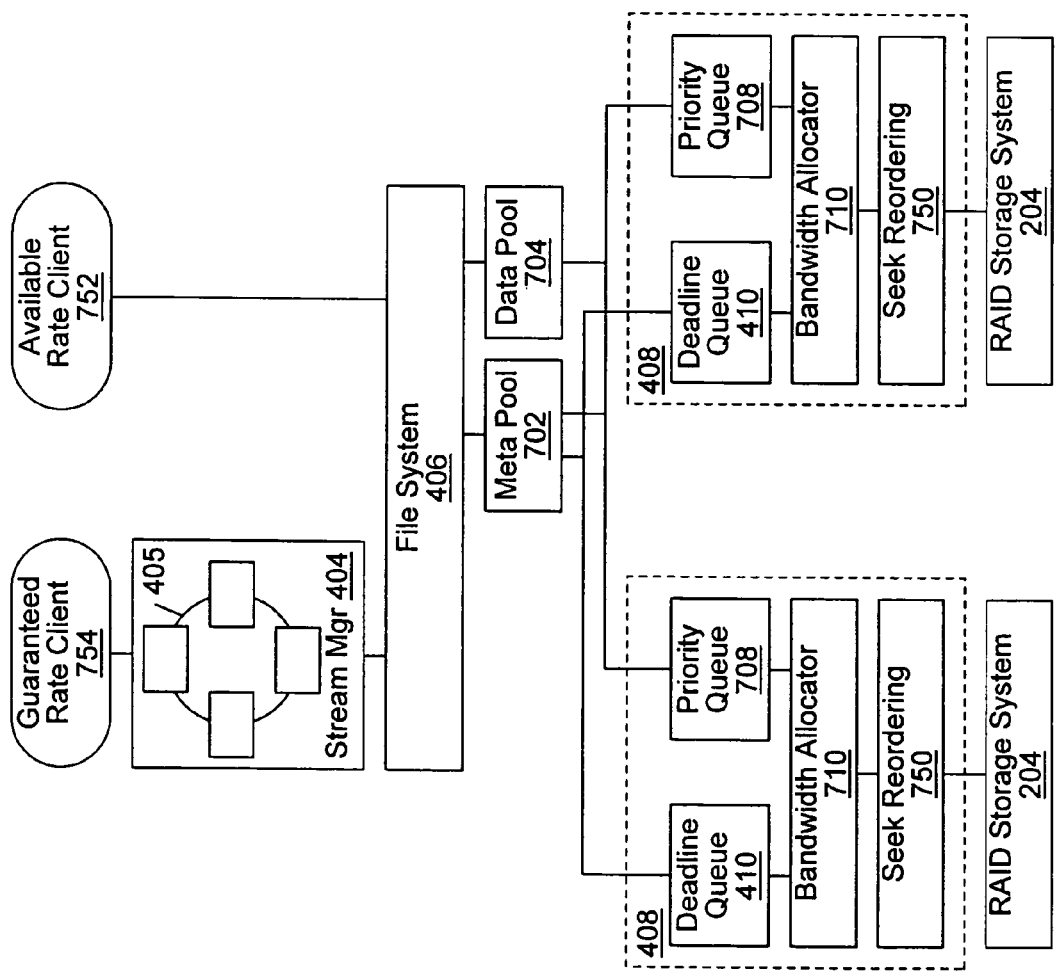
FIG. 10 illustrates a video storage manager combining mechanisms illustrated in FIGS. 4 and 7.

Turning now to FIG. 10 a video storage manager is illustrated combining the mechanisms as discussed in regard to FIGS. 4 and 7. The storage manager of FIG. 10 supports multiple continuous media streams in which clients contract for access to a file at a guaranteed bit rate. Each stream client is allowed to vary the rate of its access to its file from any rate up to the guaranteed rate. In addition, the storage manager of FIG. 10 support available bandwidth clients. A certain portion of the storage bandwidth is allocated to available bandwidth or non-rate guaranteed clients, such as available rate client 752. In addition, any bandwidth not used by the guaranteed rate clients may be available for the available rate clients. Thus, the video storage manager of FIG. 10 may support any mix of guaranteed rate clients while delivering the same aggregate bandwidth and also support available rate clients at a non-guaranteed rate.

As discussed in regard to FIG. 4, each guaranteed rate client communicates with an associated stream manager 404 which maintains a buffer ring 405 for the particular stream. The buffer ring is used to hold the next N blocks of the continuous media stream to be accessed by the requester where N is the number of buffers in the buffer ring. Each buffer may be sized equally for one block of data per buffer. Once a buffer in the ring has its data consumed by the requester, a request for the now empty buffer along with a deadline time its queued with the appropriate disk scheduler 408 as determined by file system 406. The deadline time indicates the latest time when the buffer request can be satisfied and still meet the guaranteed rate requirement of the stream. The deadline time may be calculated as:

$$deadline\_time = current\_time + (N-1)*buff\_time$$

where N is the number of buffers in the ring and buff_time is a minimum time in which the requester can consume a buffer without exceeding it contracted rate guarantee. Simultaneously with guaranteed rate request being queued with the appropriate disk scheduler 408, prioritized but non-guaranteed rate request are also queued. Non-guaranteed rate request do not carry deadlines but do carry priorities. The disk schedulers issue the queued requests to the storage systems in an order which meets the deadlines associated with the requests while obtaining a high proportion of the disk system bandwidth and allocating residual disk bandwidth after guaranteed requests to non-guaranteed requests in a manner consistent with their priorities.

Guaranteed requests from continuous stream requesters are placed into an earliest deadline ordered queue 410 in the appropriate disk scheduler. Non-guaranteed rate request are placed into a separate highest priority ordered queue 708. In addition to request from available rate clients 752 and guaranteed rate clients 754, requests may also come from the file system itself. Some requests from the file system may be time critical such as request for blocks that contain pointers to future stream blocks. Deadlines are associated with these requests and they are inserted in the appropriate deadline queue 410. Other requests, such as non-time critical file management requests, are assigned a priority and inserted in the appropriate priority queue 708. The file system requests may be buffered in a meta pool 702. Available rate client request may be buffered in a data pool 704.

Requests are migrated from the deadline and priority queues by a bandwidth allocator 710, according to a cycle which allocates bandwidth according to a configurable allocation. For example, 90 percent of a particular storage system's bandwidth may be assigned to the deadline queue and thus guaranteed rate stream clients, and 10 percent assigned to the priority queue for available rate clients. The bandwidth allocator 710 may migrate requests from the deadline and priority queues to a seek reorder queue 750. Request may be reordered in the seek reorder queue according to the position of the requested data block on the storage device. The seek reorder queue may have a configurable maximum size. Requests from the deadline and priority queues are migrated to the seek reorder queue according to the current cycle slot whenever the seek reorder queue is not filled to its maximum size. Each migration is done from the queue indicated by the current slot of the cycle and then the cycle advances to the next slot. If the queue indicated by the slot is empty, then an entry from the alternate queue is chosen if it is non-empty. The migrated entry is reordered in the seek reorder queue such that all requests to one side of the entry refer to data blocks with storage addresses greater than or equal to its address and all entries on the other side of the queue request data blocks with disk addresses less than or equal to its address.

Each seek reorder queue 750 is concurrently traversed continuously in one direction (i.e., in increasing or decreasing disk addresses) until no further entries exist in the queue in that direction and it then reverses direction and resumes. Thus, the disk scheduler issues requests from the seek reorder queue to the storage system in order of disk addresses and advances to the next request when the previously issued request has been completed by the disk system.

Because the deadline and priority queues contain requests from many different streams and clients, the sequence of blocks resulting from these queues is essentially random. If these requests where serviced according to their order in the deadline and priority queues, excessive disk seek overhead would result from the random pattern of requests. The seek reorder queue 750 improves seek time by reordering request out of the deadline and priority queues according to their disk position.

Figure 11:
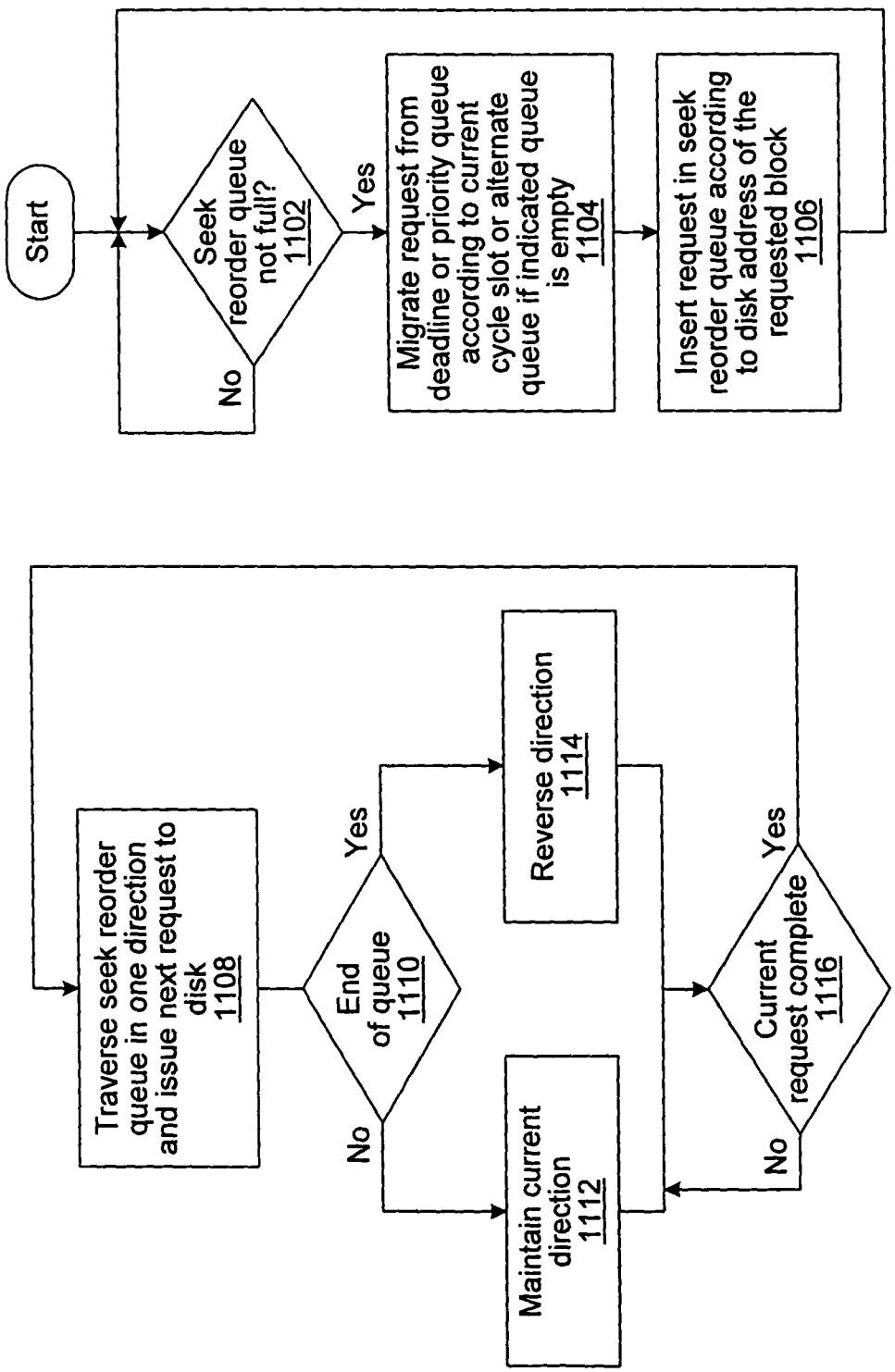
FIG. 11 is a flow chart illustrating operation of the seek reorder shown in FIG. 10.

Turning now to FIG. 11, a flow chart is provided illustrating operation of the seek reorder queue 750. As indicated at 1102, when the seek reorder queue is not full, a request is migrated from either the deadline or priority queue according to the current cycle slot. If the indicated queue is empty, the request is taken from the alternate queue if that queue is non-empty as indicated at 1104. The migrated request is inserted into the seek reorder queue according to the disk address of the requested block so that requests in the seek reorder queue are ordered by increasing or decreasing disk addresses. Simultaneously, the seek reorder queue is traversed in one direction and the next request is issued to the disk system as indicated at 1108. If the end of the seek reorder queue has been reached then the direction of queue traversal is reversed as indicated at 1110 and 1114. If the end of the seek reorder queue has not been reached, then the current traversal direction is maintained as indicated at 1110 and 1112. Once the current request has been satisfied by the disk system, the next request in the seek order queue is issued to the disk system as indicated at 1116 and 1108.

As noted earlier, block requests as viewed by the storage system are inherently random because the storage system is presented with requests from many streams. Given this randomness it would be inefficient to sequentially allocate blocks for a particular file. Because I/O cylinders of a disk often have different transfer rates, block allocation within a particular file bounces back and forth between I/O zones of the disk. Thus for any particular stream file, block storage request are assigned disk addresses so that the blocks will be located in alternating I/O zones of the disk. This ensures that all files see an average storage throughput and that no file being streamed could end up coming entirely from a low performance zone of the disk.

As mentioned above, the video storage manager must control admission of new continuous streams to ensure that the aggregate of the guaranteed stream rates does not exceed the aggregate storage bandwidth allocated for continuous media streams. Before any streaming is begun the storage systems are characterized to determine their performance or bandwidth. Once a storage system bandwidth has been determined, then when streaming begins, as each new stream is requested the video storage manager determines whether or not the requested bit rate would exceed the remaining available bandwidth allocated for continuous streams. If so, the request is denied and the requester is free to resubmit the request at a later time or with a lower bit rate request. If sufficient bandwidth exits the request is granted and a stream manager creates an associated buffer ring as discussed above.

Because a sequence of requests presented to the storage system while streaming is essentially random, modeling the stream load to characterize storage bandwidth may be simplified. This performance may be characterized with a synthetic load that reflects the characteristics of a typical load. The synthetic load may vary from a purely random sequence of blocks to take into account the fact that blocks for any given file may be placed in alternating I/O disk zones. Thus a representative load may be constructed by constraining the file system to allocate sequential blocks in a zoned random manner. The disk block address range may be divided into two halves and sequential file block allocations may be chosen from random positions within a zone alternating between the two zones. Disk performance may be characterized using this synthetic load and then de-rated to provide margin. The amount of de-rate may be referred to as the primary de-rate parameter. The de-rated bandwidth value is then multiplied by the fraction of the total bandwidth allocated in the cycle process for guaranteed rate requesters. The resulting guaranteed rate bandwidth may be de-rated again by a secondary de-rate parameter to allow for additional deadline safety margin. The result is the maximum admission bandwidth for the aggregate of all guaranteed rate requests. Guaranteed rate requesters can then be admitted until they have consumed the entire guaranteed rate admission bandwidth.

Figure 12:
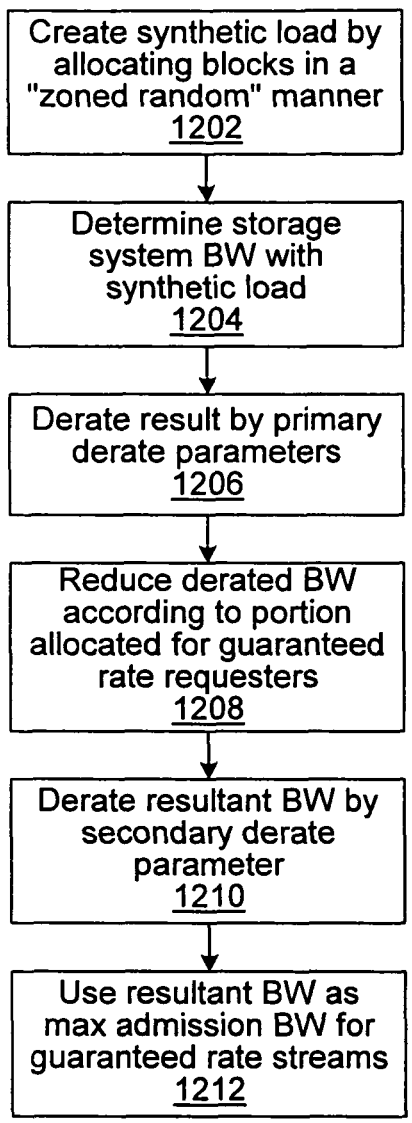
FIG. 12 is a flowchart illustrating storage characterization for admission control.

Storage characterization for admission control is summarized in FIG. 12. A synthetic load is created by allocating blocks in a zoned random manner so that sequential file block allocations are chosen from random positions within a zone alternating between an I/O disk zone as indicated 1202. Storage system bandwidth is determined using this synthetic load as indicated at 1204. The determined bandwidth is de-rated by a primary de-rate parameter to provide a certain margin as indicated at 1206. The de-rated bandwidth is reduced according to the portion of the bandwidth allocated for guaranteed rate request as indicated at 1208. This portioned bandwidth may then again be de-rated by a secondary de-rate parameter to provide extra deadline margin as indicated at 1210. The resultant bandwidth may then be used as a maximum aggregate admission bandwidth for guaranteed rate streams as indicated at 1212.

Figure 13:
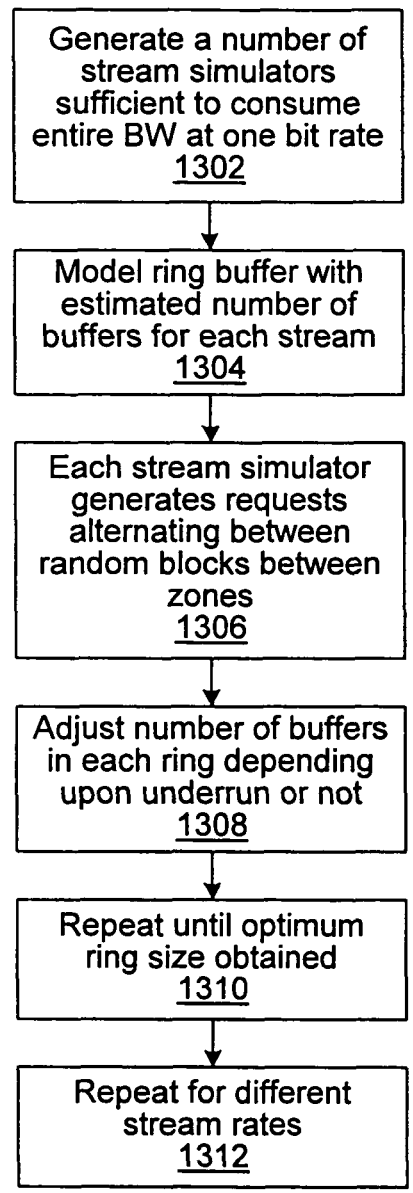
FIG. 13 is a flow chart illustrating determination of the optimum number of buffers for a buffer ring for a variety of stream rates.

The characterization process may also include determining appropriate buffer ring sizes for various stream rates across the storage system's desired operational range. The optimum number of buffers for a buffer ring may be determined for a variety of stream rates as follows. Referring to FIG. 13, for each particular stream rate, the characterization routine creates enough stream simulators to consume the entire aggregate throughput of the storage system as indicated at 1302. For each stream simulator, a ring buffer is modeled as indicated at 1304. Each stream simulator then generates block requests alternating between random blocks between zones as indicated at 1306. The simulated streams are then run until a completion of a test time or until any one of the streams suffers an underrun. An underrun occur when a buffer request is not completed before the request deadline. In a preferred embodiment, a prefill margin parameter may be set so that an underrun occurs if a buffer request is not completed within the prefill margin time before the request deadline. The number of ring buffers in the model may be adjusted and the simulation repeated as indicated at 1308 and 1310 until the correct ring buffer size is obtained. The entire simulation may then be repeated for a different stream rate as indicated at 1312. Thus a table of appropriate ring buffer sizes may be constructed during characterization for a variety of stream rates up to the maximum streams rates supported by the system. During operation whenever a new stream is admitted, an appropriately sized ring buffer may be created for the new stream by accessing this table.

The performance of the video storage manager may be tuned by adjusting a number of parameters as discussed above. These parameters are summarized in the following table.

TABLE 1

System Characterization Parameters

| Parameter | Comments |
| --- | --- |
| primaryDerate | Adjusts operational load level of storage systems relative to the maximum throughput. That is, adjusts service time (queue lengths) for storage system load at which buffer rings are sized. |
| available I/O rate | Specifies storage bandwidth reserved for metadata and available I/O. |
| secondaryDerate | Reduces streaming bandwidth to allow for additional deadline safety margin. |
| prefill margin | Specifies deadline safety margin. Note - secondaryDerate obtains underrun protection at the cost of potential streaming bandwidth; prefill margin obtains underrun protection at the cost of additional buffer memory. |
| ioOverlap | Specifies the target number of I/O requests kept queued with the operating system in the see reorder buffer. ioOverlap trades off seek efficiency against service time variability. (Higher service time variability requires more memory for buffers.) |
| blockSize | Specifies block size. blockSize trades off seek amortization against buffer fragmentation at lower stream rates. |

These parameters may be used to configure and adjust the performance of a media storage system such as the system described above. The maximum sustainable throughput of the storage system may be characterized as described above, such as by using a synthetic load. In order to adjust the operation load level of the storage system relative to the maximum throughput, the characterized maximum sustainable throughput may be derated by the primary derate parameter. The primary derate parameter is configurable and may be set during system configuration. Queues, such as the deadline queues described above, may be sized based on the derated maximum throughput as derated by the primary derate factor. The resultant throughput may be called the primary throughput. This primary throughput may be used for sizing the buffer rings as described above. The primary derate parameter provides a safety margin for the operational load level of the storage system at the expense of lowering the available maximum throughput. By setting the primary derate parameter during system configuration, the user may adjust this trade off as needed for any particular application of the storage system.

The available I/O rate parameter specifies the storage bandwidth reserved for non-rate guaranteed requests, as discussed above in regard to the bandwidth allocator. The amount of bandwidth reserved for non-guaranteed-rate requests versus guaranteed rate requests may be configured using this parameter. Depending upon a system's needs, the user may adjust the proportioning between non-guaranteed and guaranteed rate requests by adjusting this available rate parameter.

The secondary derate parameter reduces bandwidth available for rate guaranteed streams. The primary throughput is proportioned according to the available rate parameter and the proportion allocated for rate guaranteed streams is further reduced by the secondary derate parameter to provide additional deadline safety margin. During operation additional streams may be admitted up to the point that the aggregate of all stream rates entirely consumes the portion of the primary throughput allocated to guaranteed rate streams as derated by the secondary derate parameter.

The prefill margin parameter specifies a deadline safety margin used during the calculation of buffer ring sizes. During system configuration buffer ring sizes may be calculated for various stream rates, such as described in regard to FIG. 13. The prefill margin parameter specifies a margin by which the deadlines must be met during this buffer ring size calculation process, e.g., the prefill margin provides a margin by which buffer underrun must be avoided when the buffer ring sizes are being determined. Note that the prefill margin parameter obtains additional underrun protection at the cost of additional memory used for larger ring buffers. A larger prefill margin will result in larger ring buffer sizes since, for certain stream rates, additional buffers will be required in the buffer ring to avoid missing the requests' deadlines by the specified prefill margin. In contrast, the secondary derate parameter obtains additional underrun protection at the cost of potential bandwidth for rate guaranteed streams. Thus, the secondary derate parameter and prefill margin parameter provide a user of the storage system with the capability to adjust the system performance by making several different tradeoffs as is optimum for a particular application. For example, if plenty of memory is available, but additional bandwidth is needed, then the secondary derate may be lowered and the prefill margin increased. However, if memory is at a premium, the prefill margin may be decreased and the secondary derate parameter increased.

The I/O overlap parameter (also referred to as the seek reorder buffer length parameter) specifies the number of storage requests queued with the operating system for a storage unit. For example, in the system described above, a seek reorder queue is used to queue requests to the storage units in an order according to the physical disk address of the storage requests. The length of such a queue may be configured by the I/O overlap parameter. This parameter trades off seek efficiency against service time variability. For example, the larger the seek reorder queue is made, the more requests may be presented to the storage unit in a linear order thus increasing drive seek efficiency. However, since the requests are reordered from their deadline and priority orderings, a longer seek reorder queue length will increase the variability in meeting request deadlines. This parameter may be taken into account when sizing the buffer rings such that larger seek reorder queue sizes may result in larger buffer ring sizes to account for the variability in satisfying request deadlines. Therefore, the I/O overlap parameter may allow the user to trade off memory that must be made available for buffers versus higher drive seek efficiency.

In one embodiment the block size by which media data is accessed on the storage units may be configured according to a block size parameter. Configuring the block size may allow for trading off seek amortization against buffer fragmentation at lower stream rates. A larger block size may allow for greater seek efficiency, however, a larger block size may also result in more fragmentation and less efficient use of storage capacity for certain file sizes.

Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system for managing multiple rate guaranteed data stream requests, comprising:
    a memory; and
    one or more processors coupled to the memory, wherein the memory comprises program instructions executable by the one or more processors to implement:
        an admission controller that during operation negotiates a maximum stream rate with each of a plurality of rate guaranteed requesters, wherein a respective media stream client comprises each of the plurality of rate guaranteed requesters; and
        a disk scheduler, comprising:
            a guaranteed rate queue for queuing storage requests from said rate guaranteed requesters; and
            a bandwidth allocator coupled to said guaranteed rate queue, and further coupled to a storage system, wherein during operation said bandwidth allocator allocates a predetermined portion of the bandwidth of the storage system to said guaranteed rate queue;
        wherein during operation the admission controller admits an additional rate guaranteed request only if an aggregate of negotiated maximum stream rates for all current rate guaranteed requests and the additional rate guaranteed request does not exceed a calculated throughput, and denies the additional rate guaranteed request if the aggregate of the negotiated maximum stream rates for all current rate guaranteed requests and the additional rate guaranteed request exceeds the calculated throughput, wherein said calculated throughput is limited by said predetermined portion of the bandwidth of the storage system, wherein the bandwidth of the storage system is determined according to a characterized maximum sustainable throughput for the storage system.

2. The system as recited in claim 1, wherein the disk scheduler further comprises a non-rate-guaranteed queue for queuing requests from non-rate-guaranteed requesters, wherein said bandwidth allocator is configured to allocate bandwidth of the storage system between said guaranteed rate queue and said non-rate-guaranteed queue according to a predetermined ratio.

3. The system as recited in claim 2, wherein said bandwidth allocator is configured to migrate requests from said guaranteed rate queue and said non-rate-guaranteed queue to the storage system according to the predetermined ratio, wherein bandwidth not used by said guaranteed rate queue is made available to said non-rate-guaranteed queue.

4. The system as recited in claim 2, wherein said bandwidth allocator is configured to migrate requests from said guaranteed rate queue and said non-rate-guaranteed queue to the storage system according to the predetermined ratio, wherein bandwidth not used by said non-rate-guaranteed queue is made available to said guaranteed rate queue.

5. The system as recited in claim 1, wherein requests are ordered in said guaranteed rate queue according to a deadline, wherein the deadline for each request indicates a latest time by which that request must be fulfilled to meet a guaranteed maximum stream rate for the corresponding stream.

6. The system as recited in claim 1, wherein the disk scheduler is repeated for each of a plurality of storage systems.

7. The system as recited in claim 1, further comprising a buffer ring for each stream for one of the rate guaranteed requesters, wherein said buffer ring buffers stream data between an associated rate-guaranteed requester and the disk scheduler.

8. The system as recited in claim 7, wherein said buffer ring contains a number of buffers chosen to prevent buffer underrun at a guaranteed maximum stream rate, wherein each buffer is sized to hold one block of data.

9. The system as recited in claim 8, wherein the buffers of each buffer ring are consumed by the associated rate guaranteed requester one after another in a circular order, wherein as each buffer is consumed, a request and a deadline for the just consumed buffer is issued to the guaranteed rate queue, wherein the deadline indicates a time by which the request must be fulfilled to prevent underrun.

10. The system as recited in claim 9, wherein each deadline is calculated as:
current_time+(N−1)*buf_time;
wherein current_time is a time reference for the system, N is the number of buffers in the corresponding buffer ring, and buf_time is the minimum time in which the associated rate guaranteed requester can consume one of the buffers without exceeding the guaranteed maximum stream rate.

11. The system as recited in claim 1, wherein said calculated throughput is further based on said characterized maximum sustainable throughput for the storage system decreased by a configurable derate parameter.

12. The system as recited in claim 1, wherein said characterized maximum sustainable throughput is characterized by:
creating a synthetic load of data blocks in the storage system; and
determining said maximum sustainable throughput using said synthetic load.

13. The system as recited in claim 12, wherein said creating a synthetic load comprises allocating blocks randomly in inner and outer storage disk zones, wherein said allocating blocks randomly alternates between the inner and outer zones.

14. The system as recited in claim 1, wherein the admission controller is further configured to allow an additional rate guaranteed request only if sufficient memory is available for buffering to be established for the additional rate guaranteed request sufficient to prevent underrun at the negotiated maximum stream rate.

15. A method for managing multiple rate guaranteed data stream requests, the method comprising:
performing, by one or more server computers:
negotiating a maximum stream rate with each of a plurality of rate guaranteed requesters, wherein a respective media stream client comprises each of the plurality of rate guaranteed requesters;
allocating a predetermined portion of a storage system's bandwidth to stream requests from said rate guaranteed requesters;
admitting an additional rate guaranteed request only if an aggregate of negotiated maximum stream rates for all current rate guaranteed requests and the additional rate guaranteed request does not exceed a calculated throughput, wherein said calculated throughput is limited by said predetermined portion, and only if sufficient memory is available for establishing buffering for the additional rate guaranteed request sufficient to prevent buffer underrun at the negotiated maximum stream rate; and
denying the additional rate guaranteed request if the aggregate of the negotiated maximum stream rates for all current rate guaranteed requests and the additional rate guaranteed request exceeds the calculated throughput, or if sufficient memory is not available for establishing buffering for the additional rate guaranteed request sufficient to prevent buffer underrun at the negotiated maximum stream rate.

16. The method as recited in claim 15, further comprising:
allocating a remaining portion of the storage system's bandwidth to requests from non-rate-guaranteed requesters;
queuing storage requests from rate guaranteed requesters in a guaranteed rate queue;
queuing storage requests from non-rate-guaranteed requesters in a non-rate-guaranteed queue; and
selecting either the guaranteed rate queue or the a non-rate-guaranteed queue according to the bandwidth allocation to migrate one of the requests to the storage system.

17. The method as recited in claim 16, further comprising dynamically reallocating unused bandwidth for rate guaranteed requests to non-rate-guaranteed requests.

18. The method as recited in claim 16, further comprising dynamically reallocating unused bandwidth for non-rate-guaranteed requests to rate guaranteed requests.

19. The method as recited in claim 16, further comprising ordering requests in said guaranteed rate queue according to a deadline, wherein the deadline for each request indicates a latest time by which that request must be fulfilled to meet a guaranteed maximum stream rate for a corresponding multimedia data stream.

20. The method as recited in claim 15, further comprising establishing a buffer ring for each data stream from one of the rate guaranteed requesters, said buffer ring buffering stream data between an associated rate-guaranteed requester and the storage system.

21. The method as recited in claim 20, further comprising sizing said buffer ring to contain a number of buffers chosen to prevent buffer underrun at a guaranteed maximum stream rate, wherein each buffer is sized to hold one block of multimedia data.

22. The method as recited in claim 21, further comprising:
consuming the buffers of each buffer ring by the associated rate guaranteed requester one after another in a circular order; and
as each buffer is consumed, issuing a request and a deadline for the just consumed buffer to a guaranteed rate queue, wherein the guaranteed rate queue queues storage requests from rate guaranteed requesters, wherein the deadline indicates a time by which the request must be fulfilled to prevent underrun.

23. The method as recited in claim 22, further comprising calculating each deadline as:
current_time +(N−1)*buf_time;
wherein current_time is a time reference for the system, N is the number of buffers in the corresponding buffer ring, and buf_time is the minimum time in which the associated rate guaranteed requester can consume one of the buffers without exceeding the guaranteed maximum stream rate.

24. The method as recited in claim 15, further comprising determining said calculated throughput, wherein said determining said calculated throughput comprises characterizing a maximum sustainable throughput for the storage system, wherein said calculated throughput is further based on said characterized maximum sustainable throughput.

25. The method as recited in claim 24, wherein said determining said calculated throughput comprises basing said calculated throughput on said characterized maximum sustainable throughput decreased by a configurable derate parameter.

26. The method as recited in claim 24, wherein said characterizing a maximum sustainable throughput comprises:
   creating a synthetic load of data blocks in the storage system; and
   determining said maximum sustainable throughput using said synthetic load.

27. The method as recited in claim 26, wherein said creating a synthetic load comprises allocating blocks randomly in inner and outer storage disk zones, wherein said allocating blocks randomly alternates between the inner and outer zones.

* * * * *